United States Patent Office 2,725,284
Patented Nov. 29, 1955

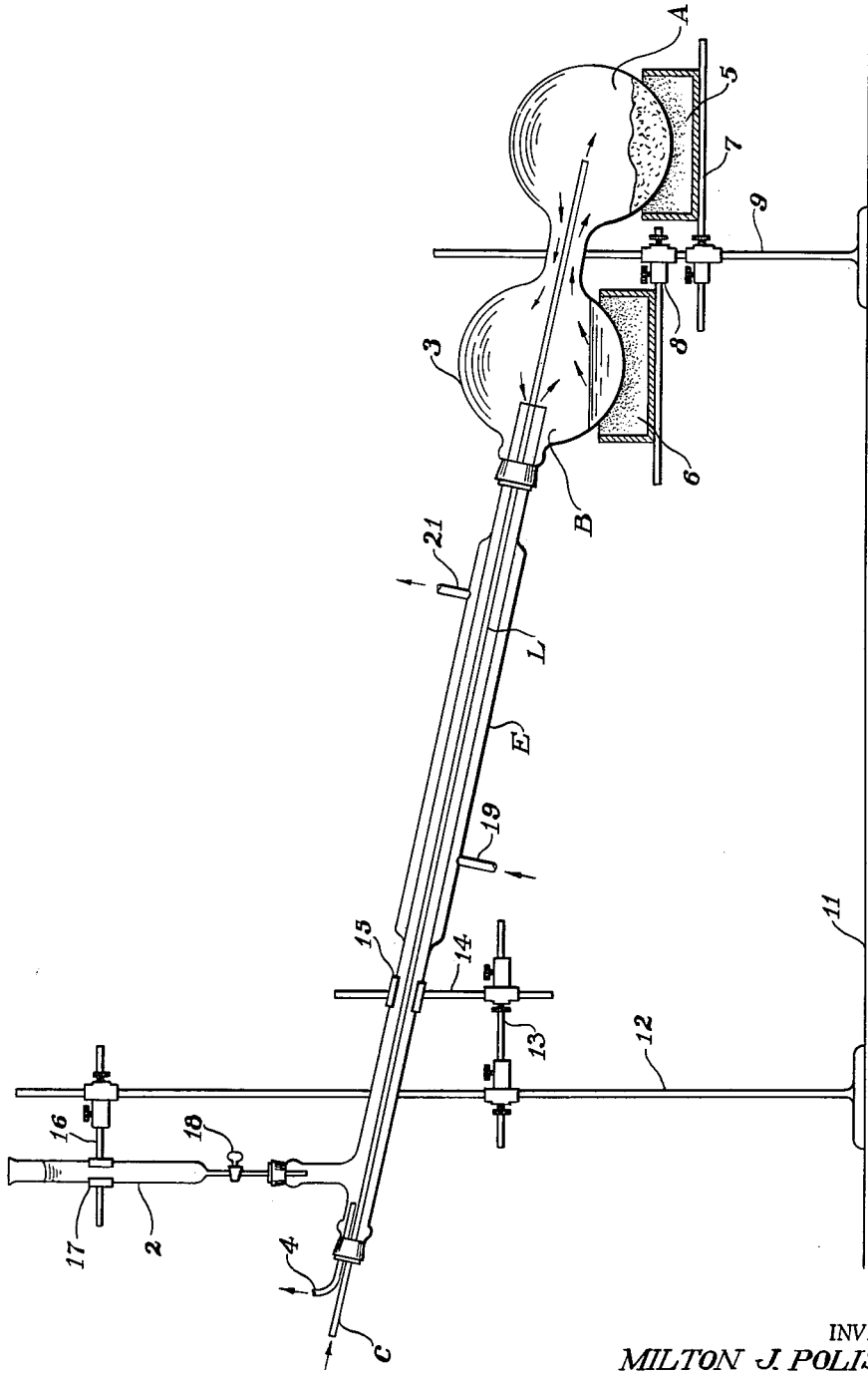

2,725,284

APPARATUS FOR REACTING DENSE CHLORINATING VAPOR WITH A SOLID

Milton J. Polissar, San Francisco, Calif., assignor to the United States of America as represented by the United States Atomic Energy Commission Original application December 13, 1943, Serial No. 514,117. Divided and this application September 24, 1945, Serial No. 618,359

7 Claims. (Cl. 23—263)

This invention relates to a new and improved apparatus useful in the manufacture of uranium tetrachloride, especially in high yields of utmost purity. More particularly, it appertains to apparatus useful in the reacting of uranium oxide and carbon tetrachloride while hindering transport of material out of the reaction zone and averting side reactions involving uranium tetrachloride. This application is a division of my copending application, Serial No. 514,117, filed December 13, 1943.

Earlier investigators, including Camboulives, Comptes Rendu (1910) 150, 175–177, and Marden, U. S. A. Patent 1,646,734 (1927), October 25, mention the formation of uranium chloride by reacting uranium oxide and carbon tetrachloride, but fail to provide an apparatus whereby the full benefits of such a method can be utilized.

Although it has been generally considered that treatment of uranium oxide at a temperature between 400° and 500° C. with carbon tetrachloride vapor slightly in excess of stoichiometrical proportions would be a very satisfactory process for preparing uranium tetrachloride if the uranium tetrachloride formed could be precluded from further reaction and the uranium-containing products could be held in the reaction vessel still, so far as known, no suitable apparatus for insuring these requisite conditions has been developed heretofore.

For example, without the provision of suitable apparatus for carrying out such a process the following difficulties have been observed. When liquid carbon tetrachloride is allowed to drip into the reaction chamber at an elevated temperature there is a high streaming velocity of the vapor past the solid. By "high streaming velocity" is meant a velocity sufficient to carry away from the reaction zone a portion of the finely divided solid material therein. As a result some uranium-containing material is transported away from the reaction mass. Some uranium pentachloride is also formed and it causes clogging of the gas exit lines by depositing therein.

This invention has for one object the provision of an improved apparatus in which a process for the complete conversion of uranium dioxide to uranium tetrachloride may be efficiently carried out. A further object is to provide a vaporizing apparatus in which the streaming velocities of gases contained therein may be minimized. A further object is to provide a vaporizing apparatus in which materials contained therein may move by gentle gravity flow. Another object is to provide a vaporizing apparatus having an improved reaction chamber. Still another object is to provide a vaporizing apparatus having improved refluxing and gas scavenging features. Other objects and advantages will become more apparent when considered in connection with the accompanying drawing and the following description.

How the foregoing objects and related ends are accomplished will be apparent from the following exposition, all of which is amplified by the accompanying drawing in which the preferred apparatus is shown diagrammatically.

Referring now to the single sheet of the drawing, there is shown a reaction vessel 3 connected to a condenser L which is in turn connected to a supply reservoir 2. An inner gas line C extends through the condenser and into the reaction vessel. The reaction vessel is shaped somewhat like an hourglass and comprises a reaction chamber A and a vaporizing chamber B. These chambers are supported on sand bath heaters 5 and 6, respectively. The sand heater 5 is supported on a bracket 7 and the sand heater 6 is supported on a bracket 8. Both brackets are secured to the upright of a stand 9 which rests on the surface 11. At the other end of the apparatus the upright of a stand 12 supports a bracket 13 which in turn supports bracket 14 which in its turn, through a clamp 15, supports the elevated end of the condenser at which end is vent 4. The upright of the stand 12 also supports a bracket 16 to which is secured a clamp 17 which in turn supports the reservoir 2. Usually the reservoir 2 is graduated and has a gravity feed valve 18 whereby the rate at which the liquid reactant is being utilized can be determined. A container for an inert gas under pressure (not shown) is connected at the upper end of the line C. The outer jacket E of the condenser has the usual inlet 19 and outlet 21 for a cooling fluid. Since the operation of the apparatus may best be understood in connection with a description of the functions which it performs during use, the following description therefore explains the operation occurring in the same during the carrying out of a process such as disclosed in my copending application.

In operation the reaction chamber A is charged with uranium dioxide and the reaction vessel 3 connected to the condenser L. A gentle stream of inert gas such as nitrogen is flowed into the reaction chamber A through the line C to sweep out the air. The flow of inert gas continues throughout the reaction during which time it serves to sweep out by-product gases and excess carbon tetrachloride vapor. Heat is then applied to the reaction chamber A and a flow of carbon tetrachloride started through the valve 18. This carbon tetrachloride collects in the vaporizing vessel B. After a pool of the desired size has collected, heat is applied and the addition of carbon tetrachloride from the reservoir 2 regulated to keep the level substantially constant. Upon the application of heat to the vaporizing chamber B some of the carbon tetrachloride vapors enter the condenser L and are refluxed. Another portion of the vapor flows by gravity into the reaction chamber where it reacts with the uranium dioxide, usually forming carbon monoxide, carbon dioxide, phosgene and chlorine. These gases are swept up into the condenser along with some carbon tetrachloride vapor by means of the nitrogen entering through the line C. Some of the phosgene is dissolved in the carbon tetrachloride and carried back into the reaction chamber where it reacts with the uranium dioxide. The gases which are not condensed in the condenser are vented through the line 4, usually into a scrubber of some sort.

Heretofore, efforts to drop the carbon tetrachloride directly into the reaction chamber have not been successful since liquid carbon tetrachloride boils to form relatively tremendous volumes of vapor and as a result the velocity of the gas sweeps some of the desired product out of the reaction vessel, thereby lowering the yield. In addition, uranium pentachloride, which is volatile relative to the $UCl_4$, is formed in such an operation and passes into the condenser, clogging the apparatus. As a result of my improved apparatus, however, such difficulties no longer are an obstacle. As an illustration of the conditions under which the apparatus may be employed the following two examples are given.

Example I

Place a charge of 2,242 parts of uranium dioxide in the reaction chamber A of the previously described apparatus. Connect the reaction vessel 3 to condenser as shown in the drawing. Introduce nitrogen in a slow stream through the inner line C to sweep out, first, the air from the apparatus, and then, after the reaction starts, the gaseous reaction products. Apply heat to the bulb containing the solid raw material and start dropping carbon tetrachloride from the measuring container 2 into the condenser L. This liquid will collect in the vaporizing chamber B. Apply heat to the bulb containing the carbon tetrachloride and, when it starts refluxing, maintain that condition. The carbon tetrachloride vapor at its boiling point is very much heavier than nitrogen and the hot gases such as carbon monoxide, carbon dioxide, phosgene and chlorine formed in the course of the reaction. Some of the carbon tetrachloride, therefore, continuously and gently flows downwardly into the reaction chamber. When there is no reaction, the only gas leaving the system is the small amount of nitrogen used to maintain the slight sweeping action. When the reaction mass reaches 450° C., maintain it at that temperature until the reaction is complete. In addition to carbon monoxide and carbon dioxide formed during the reaction, some phosgene ($COCl_2$) and chlorine are produced. At least a part of the phosgene is absorbed by the carbon tetrachloride and returned for reaction with the uranium oxide. By adjusting the flow of carbon tetrachloride from the reservoir to keep the volume of the pool in the vaporizing chamber B substantially constant the rate of the reaction can be accurately followed. At the completion of the reaction 3,153 parts of uranium tetrachloride will be obtained from the reaction chamber.

Example II

Repeat the procedure of Example I using 1,056 parts of uranium trioxide and maintain at an operating temperature of 500° C. A yield of 1,392 parts of uranium tetrachloride will be obtained. $UCl_5$ which tends to form due to the use of $UO_3$ as charge stock is thermally unstable at this reaction temperature, and is substantially converted into $UCl_4$.

When using this apparatus and employing uranium dioxide in the production of uranium tetrachloride, the reaction temperature should be maintained as near 450° C. as practicable. However, good results are obtained in the range 425° to 475° C. Difficulties are encountered below 400° C. and above 500° C., and these temperatures may be considered the satisfactory operating limits.

Atmospheric pressure is preferred, although elevated pressures are not objectionable and small pressure variations do not materially affect the yields or purity of the product.

The reaction is usually complete in less than five hours, the time depending to some extent on the crystalline form and particle size of the raw material, the temperature of the reaction, and the size of the charge. Ordinary commercial purity carbon tetrachloride is satisfactory for the reaction. The apparatus heretofore described may be made of a suitable material, such as glass or metal.

Inert gases other than nitrogen may be utilized but in the case of materials like illuminating gas some pyrolysis has been noted. The apparatus may be utilized for chlorinating other oxides but where the conditions of the reaction may produce a very volatile metal chloride as a reaction product, clogging of the exit lines is usually encountered.

Since uranium compounds are expensive and usually handled in small quantities it has appeared satisfactory to illustrate laboratory-size apparatus. With cheaper metals, which can be handled on a much larger scale, it is obvious that plant size or large scale metal apparatus would be used.

After the uranium tetrachloride has been produced it may be poured from the chamber. It should be run into a dry container and maintained in storage under an environment of carbon dioxide or in vacuum.

The uranium tetrachloride produced in accordance with the present invention has a crystal size and structure especially suitable for sublimation or vaporization in vacuum apparatus. Its form allows it to be readily outgassed and there is little tendency for it to be transported as a dust while being processed in a vacuum.

Probably many apparently widely different embodiments of this invention may be made without departing from the principle, breadth and spirit thereof and it is to be understood therefore that this invention is not limited to the specific embodiments thereof except as encompassed in the claims.

What is claimed is:

1. Apparatus for conducting a reaction between a vaporizable and a solid material comprising a pair of communicating chambers disposed along an inclined axis, the lower portion of the upper chamber forming a reservoir for said vaporizable material and the lower chamber being adapted to contain said solid material, an opening in the upper of said chambers having the lower end of an inclined jacketed condenser detachably secured and sealed thereto, a tube extending from the outside through the interior of said condenser and said upper chamber into said lower chamber providing a communicating passage therewith, a tube connecting the interior of the upper portion of the condenser with a source of said vaporizable material, a vent from the upper portion of said condenser, and independent heating means for each of said chambers.

2. Apparatus for conducting a reaction between a vaporizable and a solid material comprising a reaction vessel having formed therein upper and lower communicating chambers, the upper of said chambers having an opening formed in the upper portion thereof and serving as a reservoir for said vaporizable material while said lower chamber forms a reaction chamber for said solid material, a jacketed condenser detachably secured and sealed to the opening in said upper chamber, means including a tube extending exteriorly of said condenser, passing through the interior thereof and extending through said upper chamber into said lower chamber for supplying an inert gas thereto during said reaction, a tube connecting the upper portion of the interior of the condenser with a vaporizable material reservoir having a controllable discharge outlet, a vent from the upper portion of said condenser, and independent heating means for each of said chambers.

3. The apparatus as defined in claim 2, wherein the upper and lower chambers of said reaction vessel are arranged in an hour-glass configuration.

4. Apparatus for conducting a reaction between a fluid capable of producing a dense vapor upon being heated and a solid material comprising a reaction vessel having an upper heated vaporizing chamber communicating with a lower heated reaction chamber, said vaporizing chamber having a depressed heated reservoir portion for retaining and vaporizing said fluid and said reaction chamber serves to contain said solid material during the reaction, an opening in the vaporizing chamber having the lower end of an inclined jacketed condenser tube detachably secured and sealed thereto, a tube extending from the outside through the interior of said condenser tube and the vaporizing chamber into the reaction chamber through which an inert gas may be supplied thereto, a reservoir source of said fluid connected with a tube to the upper interior of said condenser to provide for the introduction of said fluid therein, and a gas vent leading exteriorly from the upper end of said condenser tube.

5. The apparatus as defined in claim 4 wherein said upper vaporizing and reaction chambers are disposed along an inclined axis and have a general hour-glass configuration.

6. The apparatus as defined in claim 4 wherein said reaction vessel is formed as a pair of bulbous chambers arranged along an inclined axis and communicating with each other through a constriction situated therebetween thereby providing said communicating vaporizing and reaction chambers therein.

7. Apparatus for conducting a reaction between a fluid capable of producing a dense vapor upon being heated and a solid material comprising a reaction vessel having an upper vaporizing chamber communicating with a lower reaction chamber arranged along an inclined axis, said vaporizing chamber serving to retain and vaporize said fluid and said reaction chamber serving to contain said solid material during said reaction, an opening in the vaporizing chamber to which is detachably secured and sealed a condenser for returning vaporized material to said vaporizing chamber and for providing a vent from the upper portion thereof, means communicating with said reaction chamber for the introduction of an inert gas therein, a reservoir source of said fluid connected with said vaporizing chamber for introducing said fluid therein, and independent heating means for each of said chambers.

References Cited in the file of this patent
UNITED STATES PATENTS

| | | |
|---|---|---|
| 1,082,530 | Kaufler et al. | Dec. 30, 1913 |
| 1,098,356 | Ramage | May 26, 1914 |

OTHER REFERENCES

Eimer and Amend Laboratory Apparatus Catalogue (85th Anniversary), page 211, item 20430; page 322, item 22657.